US007589867B2

(12) United States Patent  
Kato

(10) Patent No.: US 7,589,867 B2
(45) Date of Patent: Sep. 15, 2009

(54) IMAGE DATA FLOW PRODUCING SYSTEM, METHOD AND PROGRAM

(75) Inventor: Hiroyuki Kato, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 502 days.

(21) Appl. No.: 11/277,014

(22) Filed: Mar. 20, 2006

(65) Prior Publication Data

US 2007/0233716 A1    Oct. 4, 2007

(51) Int. Cl.
    *H04N 1/40* (2006.01)
(52) U.S. Cl. .................. 358/2.1; 358/1.15; 358/448
(58) Field of Classification Search ............... 358/1.9, 358/2.1, 448, 1.15, 3.23
    See application file for complete search history.

(56) References Cited

U.S. PATENT DOCUMENTS 6,031,638 A * 2/2000 Rao et al. ................. 358/474
6,380,111 B1 * 4/2002 Maeda et al. .............. 501/64
2003/0103162 A1 * 6/2003 Sano et al. ................ 348/383
2006/0062476 A1 * 3/2006 Yamada ..................... 382/224

* cited by examiner

*Primary Examiner*—Thomas D Lee
*Assistant Examiner*—Stephen M Brinich
(74) *Attorney, Agent, or Firm*—SoCal IP Law Group LLP; Steven C. Sereboff; John E. Gunther

(57) ABSTRACT

To contribute to a reduction in work loads in production of an image data flow, an image data flow producing system includes: an input attribute acquiring unit that acquires attribute information of image data that should be inputted to a processing unit at a front stage among the plural processing units forming the image data flow; an output attribute acquiring unit that acquires attribute information of image data that should be outputted from a processing unit at a last stage among the plural processing units forming the image data flow; and an image data flow producing unit that combines a predetermined plural processing units on the basis of the attribute information to thereby produce an image data flow for outputting image data having the attribute information acquired by the output attribute acquiring unit when image data having the attribute information acquired by the input attribute acquiring unit is inputted.

20 Claims, 13 Drawing Sheets

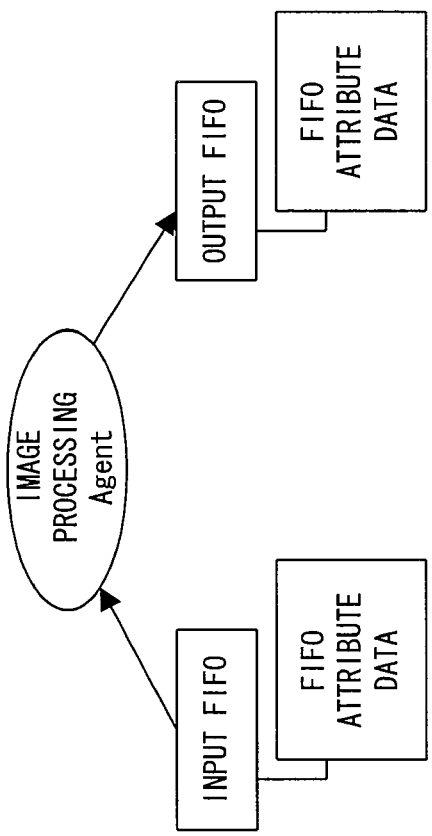

| FIFO ATTRIBUTE | EXAMPLE |
|---|---|
| IMAGE DATA STORING LOCATION | Shared Memory, File (HDD), Page Memory, ADF, Printer, ··· |
| IMAGE DATA FORMAT | PAPER, Raw DATA, ORIGINAL FORMAT, JPEG, TIFF, PDF, ··· |
| IMAGE DATA SIZE | 1 Page, Band, Chunk, Block, ··· |

| IMAGE PROCESSING AGENT SCORE | EXAMPLE |
|---|---|
| PERFORMANCE SCORE | SCORE IS HIGHER AS PERFORMANCE IS HIGHER |
| IMAGE QUALITY SCORE | SCORE IS HIGHER AS IMAGE QUALITY IS BETTER |
|  | SCORE IS HIGHER AS IMAGE QUALITY DETERIORATION DUE TO PROCESSING IS SMALLER |
| RESOURCE CONSUMPTION SCORE | SCORE IS HIGHER AS RESOURCE CONSUMPTION IS LESS |

IMAGE DATA WORKFLOW

FIRST FIFO ATTRIBUTES ARE SAME

LAST FIFO ATTRIBUTES ARE SAME

COMBINATIONS OF IMAGE PROCESSING UNITS BETWEEN FIRST AND LAST FIFOS ARE DIFFERENT

100 POINTS

80 POINTS

96 POINTS

FIG. 16

SCORES THAT RESPECTIVE AGENTS HAVE FIRST

| Agent NAME | PROCESSING | PERFORMANCE SCORE | IMAGE QUALITY SCORE | RESOURCE CONSUMPTION SCORE |
|---|---|---|---|---|
| Agent A | SCAN | 9 | 9 | 9 |
| Agent B | COPY(PageMemory→MainMemory) | 1 | 9 | 3 |
| Agent C | ROTATION(ON MainMemory, Raw DATA) | 1 | 9 | 1 |
| Agent D | COMPRESSION(ON MainMemory) | 3 | 1 | 3 |
| Agent E | COPY(MainMemory→PageMemory) | 3 | 9 | 3 |
| Agent F | PRINT | 9 | 9 | 9 |
| Agent G | COMPRESSION(ON PageMemory) | 3 | 1 | 3 |
| Agent H | COPY(PageMemory→MainMemory) | 3 | 3 | 9 |
| Agent I | ROTATION(ON PageMemory, COMPRESSED DATA) | 1 | 3 | 1 |
| Agent J | COPY(MainMemory→PageMemory) | 3 | 9 | 3 |

FIG. 17

SCORE CALCULATION FOR RESPECTIVE WORKFLOWS (=TOTAL OF SCORES OF RESPECTIVE AGENTS)

| Workflow NAME | PROCESSING ORDER | PERFORMANCE SCORE | IMAGE QUALITY SCORE | RESOURCE CONSUMPTION SCORE | (CALCULATION METHOD) |
|---|---|---|---|---|---|
| Workflow A | Agent A→B→C→D→E→F | 26 | 46 | 28 | A+B+C+D+E+F |
| Workflow B | Agent A→G→H→I→J→F | 28 | 34 | 34 | A+G+H+I+J+F |

IMAGE DATA FLOW PRODUCING SYSTEM, METHOD AND PROGRAM

BACKGROUND OF THE INVENTION

1. Field of the Invention

The present invention relates to a technique for producing an image data flow that defines a flow of processing applied to image data.

2. Description of the Related Art

In document management and content management, there is a tool application that automatically forms a workflow corresponding to a business process. For example, there are products such as Adobe Livecycle Workflow (registered trademark) of Adobe (registered trademark). With the products, it is possible to integrate a process on a document basis with a basic business application of a company such as document management. It is possible to realize efficiency of a business process based on documents by defining a workflow of the documents and performing automatic production of a workflow, management of a workflow, and association with existing business applications.

In recent years, a function for customizing a function that an MFP (Multi Function Peripheral) serving as an image forming apparatus has is provided. Examples of the function that the MFP has include image processing based on an "image data flow" that defines a flow of processing applied to image data.

However, combinations of image data flows in the MFP vary depending on users. Thus, conventionally, there is no way but to define and embed all the image data flows in the MFP or select image data flows frequently used by a large number of users to limit the number of image data flows and set the image data flows in the MFP.

In the MFP, intermediate image data is treated because of an image processing ASIC and image processing software. Thus, in order to realize an image data flow desired by a user, it is necessary to design, taking into account performance, an image quality, and the like, an image data flow that processes the intermediate image data. Conventionally, the design of such an image data flow is performed by a design engineer of an MFP vendor and is laborious work that consumes time for optimization.

SUMMARY OF THE INVENTION

The invention has been devised in order to solve the problems and it is an object of the invention to provide a technique that can contribute to a reduction in work loads in production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed.

In order to solve the problems, an image data flow producing system according to the invention is an image data flow producing system that performs production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed. The image data flow producing system includes: an input attribute acquiring unit that acquires attribute information of image data that should be inputted to a processing unit at a front stage among the plural processing units forming the image data flow to be produced; an output attribute acquiring unit that acquires attribute information of image data that should be outputted from a processing unit at a last stage among the plural processing units forming the image data flow to be produced; and an image data flow producing unit that combines a predetermined plural processing units on the basis of the attribute information acquired by the input attribute acquiring unit and the attribute information acquired by the output attribute acquiring unit to thereby produce an image data flow for outputting image data having the attribute information acquired by the output attribute acquiring unit when image data having the attribute information acquired by the input attribute acquiring unit is inputted.

An image data flow producing method according to the invention is an image data flow producing method of performing production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed. The image data flow producing method includes: an input attribute acquiring step of acquiring attribute information of image data that should be inputted to a processing unit at a front stage among the plural processing units forming the image data flow to be produced; an output attribute acquiring step of acquiring attribute information of image data that should be outputted from a processing unit at a last stage among the plural processing units forming the image data flow to be produced; and an image data flow producing step of combining a predetermined plural processing units on the basis of the attribute information acquired in the input attribute acquiring step and the attribute information acquired in the output attribute acquiring step to thereby produce an image data flow for outputting image data having the attribute information acquired in the output attribute acquiring step when image data having the attribute information acquired in the input attribute acquiring step is inputted.

An image data flow producing program according to the invention is an image data flow producing program for causing a computer to execute production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed. The image data flow producing program causing the computer to execute: an input attribute acquiring step of acquiring attribute information of image data that should be inputted to a processing unit at a front stage among the plural processing units forming the image data flow to be produced; an output attribute acquiring step of acquiring attribute information of image data that should be outputted from a processing unit at a last stage among the plural processing units forming the image data flow to be produced; and an image data flow producing step of combining a predetermined plural processing units on the basis of the attribute information acquired in the input attribute acquiring step and the attribute information acquired in the output attribute acquiring step to thereby produce an image data flow for outputting image data having the attribute information acquired in the output attribute acquiring step when image data having the attribute information acquired in the input attribute acquiring step is inputted.

DESCRIPTION OF THE DRAWINGS

In the accompanying drawings:

FIG. 2 is a diagram for explaining a constitution of an individual image processing unit forming an image data flow formed by plural image processing units;

FIG. 3 is a diagram for explaining the constitution of the individual image processing unit forming the image data flow formed by the plural image processing units;

FIG. 16 is a diagram for explaining definition information concerning scores associated with respective image processing Agents;

FIG. 17 is a diagram for explaining a scoring method for respective image data flows;

DESCRIPTION OF THE EMBODIMENTS

An embodiment of the invention will be hereinafter explained with reference to the accompanying drawings.

Figure 1:
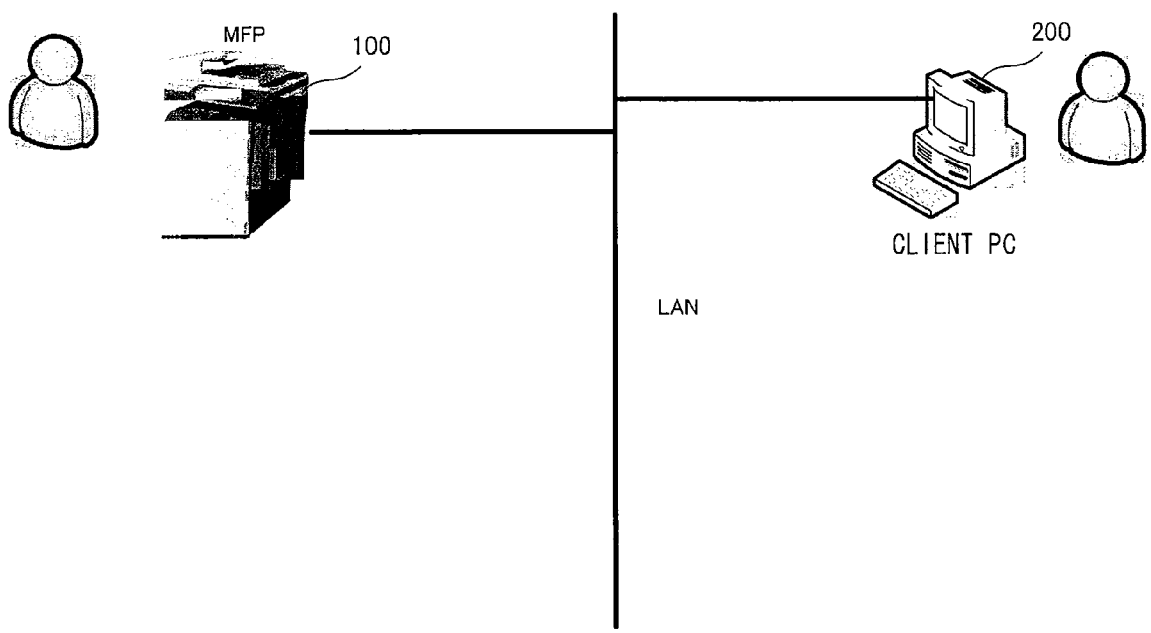
FIG. 1 is a block diagram showing an overall constitution of an image data flow producing system according to an embodiment of the invention.

FIG. 1 is a block diagram showing an overall constitution of an image data flow producing system according to the embodiment of the invention. The image data flow producing system according to this embodiment has a role of producing an image data flow that includes plural processing units for performing predetermined processing concerning image data and sequentially passes processing results in processing units at pre-stages to processing units at post-stages as inputs to the processing units at the latter stages to thereby apply a series of processing to image data to be processed.

As shown in FIG. 1, an MFP 100 serving as an image forming apparatus is connected to a network LAN. The MFP 100 includes an image processing ASIC and image processing software and performs predetermined image processing when copy, scan, print, FAX, and the like are executed. A client PC 200 is connected to the MFP 100 via the network. The client PC 200 plays a role of a user interface with the MFP 100 for automatically producing an image data flow in the MFP 100.

FIGS. 2 and 3 are diagrams for explaining a constitution of an individual image processing unit forming an image data flow formed by plural image processing units (processing units). As shown in FIG. 2, the image processing units includes three units, namely, an image processing Agent, an input FIFO (First-In First-Out), and an output FIFO. The respective FIFOs have "FIFO attribute data". The FIFO attribute data has, for example, attributes of an image data storing location, an image data format, and an image data size as indicated by a table shown in FIG. 3.

The attribute of the "image data storing location" includes names of storages (Shared Memory, File (HDD), and Page Memory). Besides the names of storages, in media conversion to and from paper, devices such as an ADF, an original stand glass surface, and a Printer could be values of the attribute. The attribute of the "image data format" includes electronic format (a Raw data format, an original format, JPEG, TIFF, and FDF). In the case of paper, "paper" could be a value of the format attribute. Moreover, the "image data size" includes one page, Band, and Chunk and Block that are a group of data.

As shown in FIG. 3, the image processing Agent has an attribute of scores. For example, there are three attributes, namely, performance, an image quality, and a resource consumption quantity. The performance score is higher as performance of processing performed by the image processing Agent is higher. The image quality score is higher as an image quality of processing performed by the image processing Agent is higher and image quality deterioration due to the processing is smaller. The resource consumption score is higher as resource consumption is less.

Figure 4:
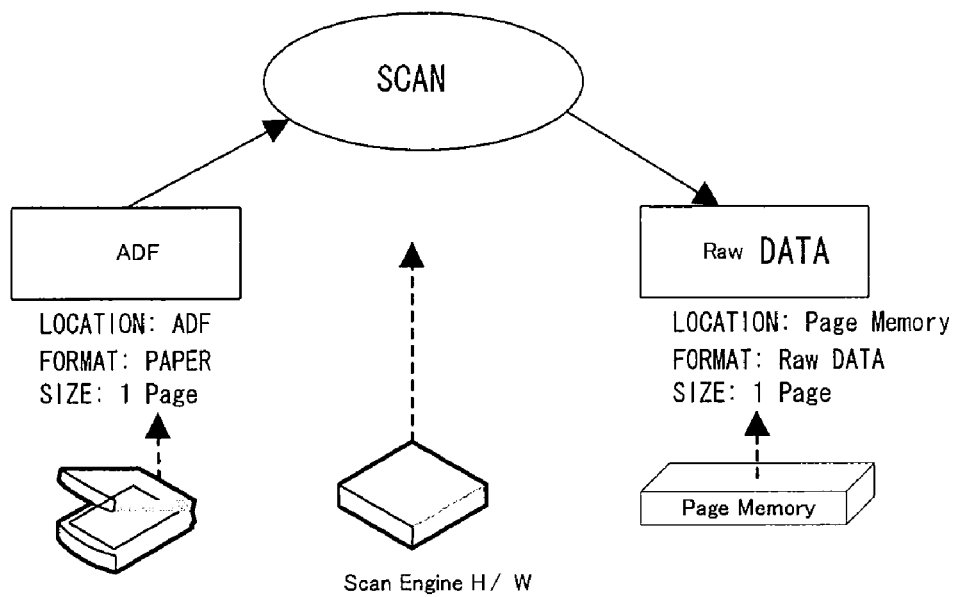
FIG. 4 is a diagram showing an example of an image processing unit.
Figure 5:
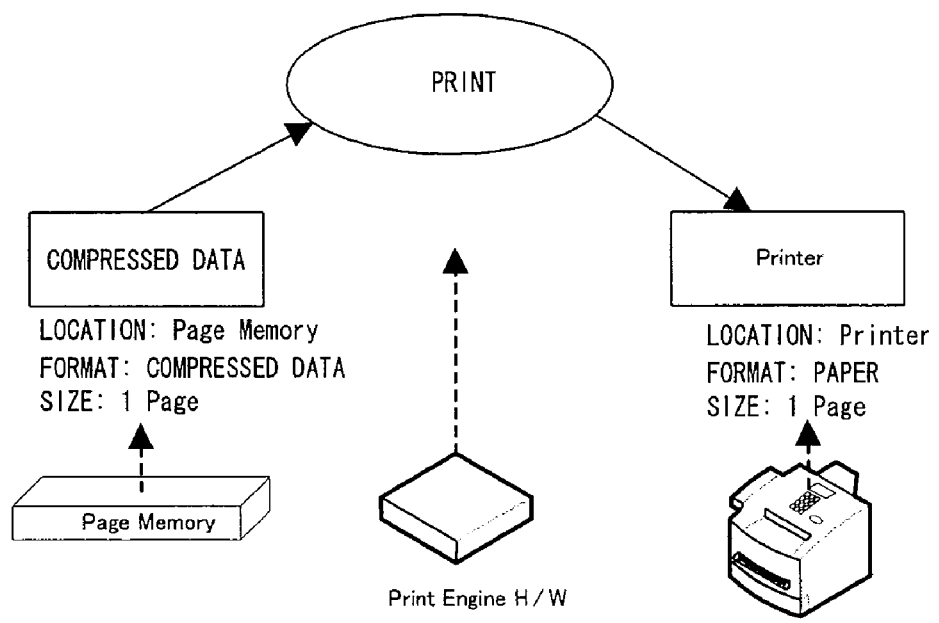
FIG. 5 is a diagram showing an example of the image processing unit.

FIGS. 4 and 5 are diagrams showing examples of an image processing unit. In the case of "scan", as shown in FIG. 4, as the attributes of the input FIFO, the image data storing location is ADF, the image data format is paper, and the image data size is Page. As the attributes of the output FIFO, the image data storing location is Page Memory, the image data format is Raw data, and the image data size is Page.

In the case of "print", as shown in FIG. 5, as the attributes of the input FIFO, the image data storing location is Page Memory, the image data format is original format, and the image data size is Page. As the attributes of the output FIFO, the image data storing location is Printer, the image data format is paper, and the image data size is Page.

Figure 6:
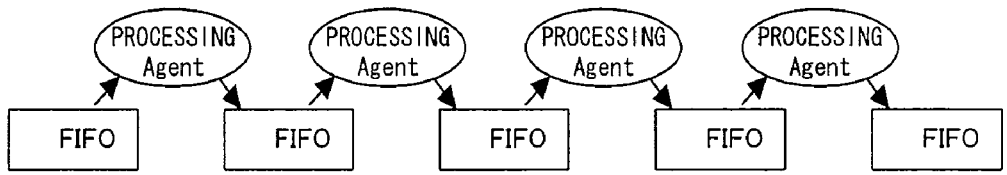
FIG. 6 is a diagram for explaining an image data workflow.
Figure 7:
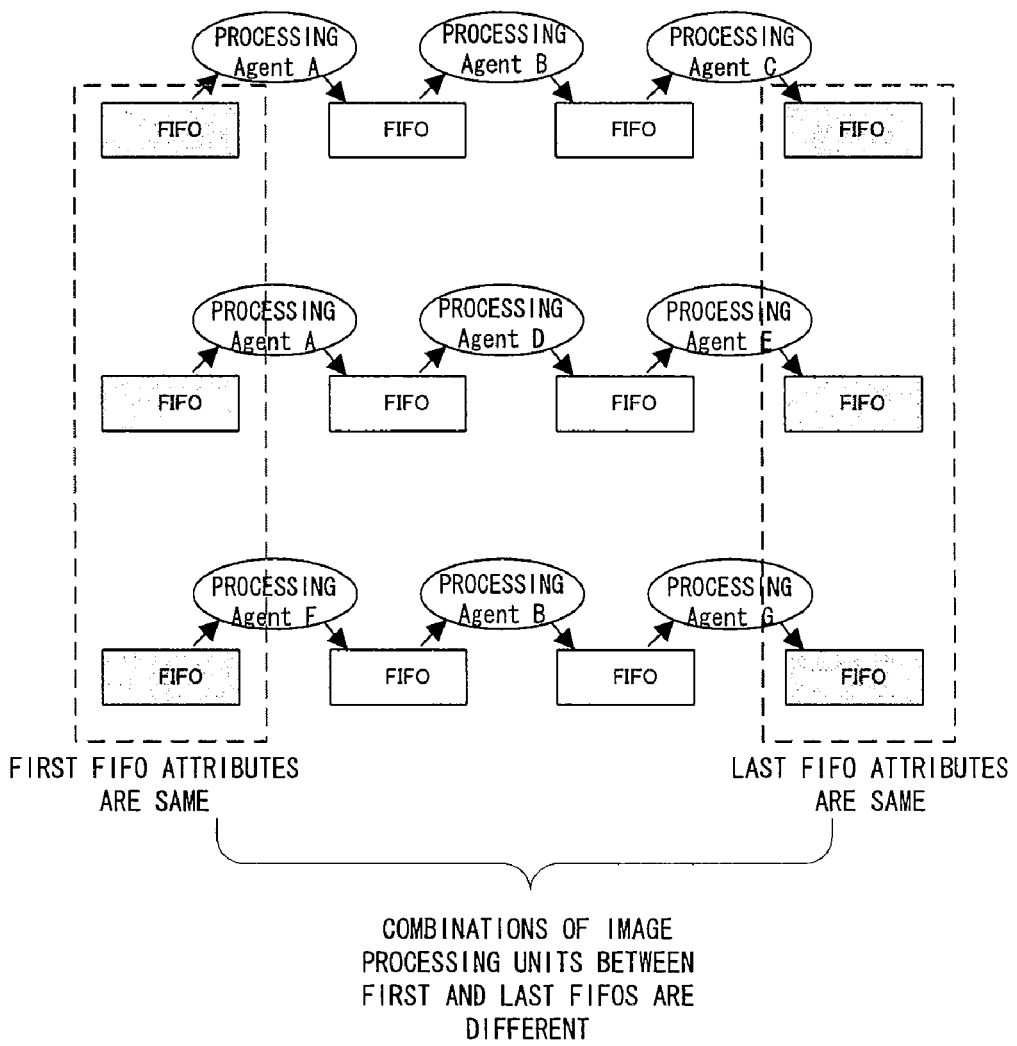
FIG. 7 is a diagram for explaining an image data workflow.

FIGS. 6 and 7 are diagrams for explaining an image data workflow. The image data workflow is also referred to as an image data flow. As shown in FIG. 6, the image data flow is realized by a combination of image processing units. In this case, input FIFOs and output FIFOs of the respective image processing units in a connection relation have to have the same attributes. FIG. 7 indicates that, if attributes of first and last FIFOs are the same, there are several candidates of combinations of image processing units between the first and the last FIFOs. The combinations are as described below in order from the one shown at the top of the figure.

Processing Agent A→Processing Agent B→Processing Agent C

Processing Agent A→Processing Agent D→Processing Agent E

Processing Agent F→Processing Agent B→Processing Agent G

FIG. 7 indicates that, although a user designated only the first and the last FIFOs, it is likely that there are plural ways of combinations of image processing units between the first and the last FIFOs.

Figure 8:
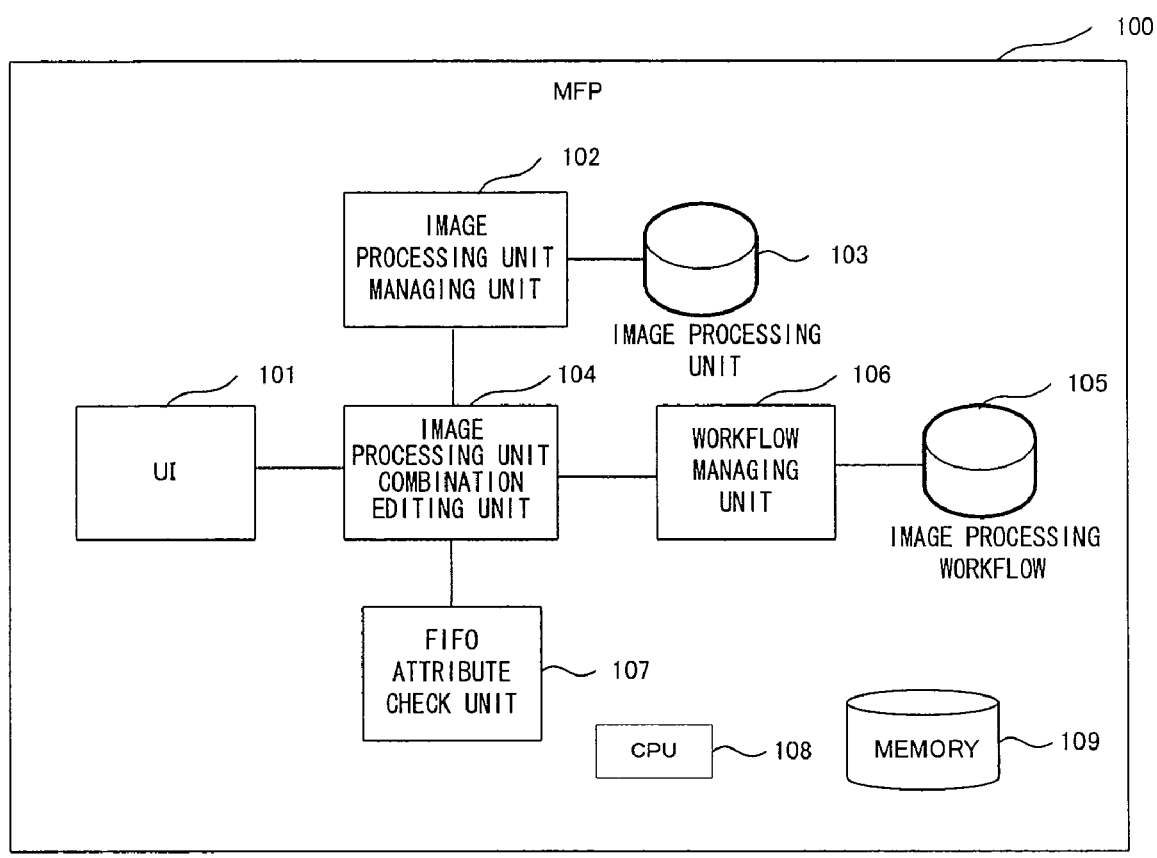
FIG. 8 is a block diagram showing an internal constitution of an MFP 100.

FIG. 8 is a block diagram of an internal constitution of the MFP 100. The MFP 100 includes a UI 101 that provides a user interface for receiving an operation input of a user, an image processing unit managing unit 102 that is a module for managing image processing units of a defined storage that is defined in advance according to hardware (an image processing ASIC, a scanner, a printer, and a FAX), image processing software, and the like mounted on the MFP 100 and is stored in the image processing unit storing unit 103, an image processing unit combination editing unit (an input attribute acquiring unit, an output attribute acquiring unit, and a selecting unit) 104 that is a unit for managing combination edition of image processing units and produces an image data flow by defining a combination of image processing units, a workflow managing unit 106 that manages an image processing workflow storing unit 105 in which an image data flow of the defined storage is stored, an FIFO attribute check unit 107 that checks, when image processing units are connected, whether input FIFO attributes and output FIFO attributes of the image processing units are the same and whether it is possible to connect the image processing units, a CPU 108, and a MEMORY 109.

The image processing unit combination editing unit 104 has a role of acquiring attribute information of image data that should be inputted to a processing unit at a front stage among plural processing units forming an image data flow to be produced and acquiring attribute information of image data that should be outputted from a processing unit at a last stage among the plural processing units forming the image data flow to be produced.

A function of an image data flow producing unit is realized by the image processing unit combination editing unit 104 and the FIFO attribute check unit 107. The image processing unit combination editing unit 104 and the FIFO attribute check unit 107 produce an image data flow for outputting, when image data having attribute information acquired by the input attribute acquiring unit is inputted, image data having attribute information acquired by the output attribute acquiring unit by combining predetermined plural processing units on the basis of the attribute information acquired by the input attribute acquiring unit and the attribute information acquired by the output attribute acquiring unit.

The CPU 108 has a role of performing various kinds of processing in the image data flow producing system according to this embodiment. The CPU 108 also has a role of realizing various functions by executing programs stored in the MEMORY 109. The MEMORY 109 is constituted by, for example, a ROM or a RAM and has a role of storing various kinds of information and programs used in the image data flow producing system.

An operation of image data flow automatic production (an image data flow producing method) by the image data flow producing system according to this embodiment is explained with reference to a main flowchart shown in FIG. 9. First, a user designates an input image and attributes of the image (input FIFO attributes) and an output image and attributes of the image (output FIFO attributes) via the UI 101 (S601). The user instructs automatic production of an image data flow via the UI 101 (S602).

On the basis of these instructions, the MFP 100 acquires the input FIFO attributes and the output FIFO attributes (an input attribute acquiring step and an output attribute acquiring step) and determines optimum connection of image processing units (an image data flow) (an image data flow producing step) (S603). Details of the operation of image data flow automatic production follow a flowchart shown in FIGS. 10 and 11 described later. The image processing unit managing unit 102, the image processing unit combination editing unit 104, the FIFO attribute check unit 107, and the workflow managing unit 106 operate in cooperation with one another.

The user approves, via the UI 101, the image data flow determined by the MFP 100 (S604). When the approval is obtained from the user via the UI 101, the MFP 100 stores the image data flow in the image processing workflow storing unit 105 via the workflow managing unit 106 (S605).

Figure 9:
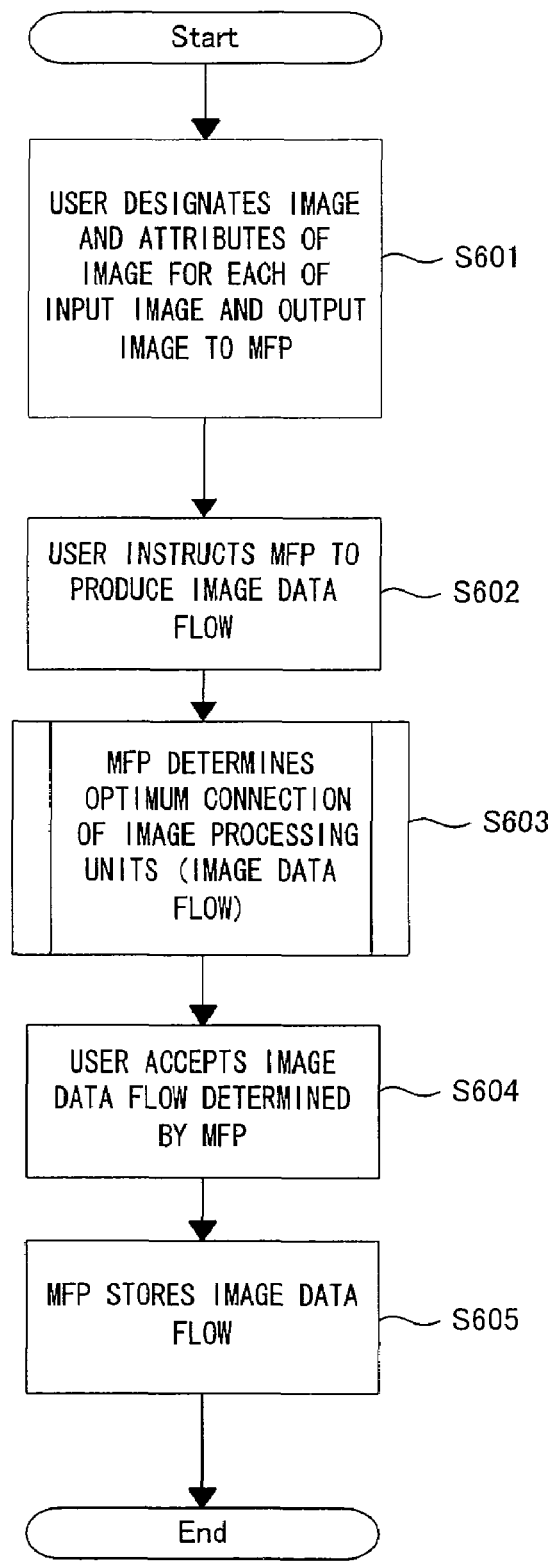
FIG. 9 is a main flowchart showing an operation of image data flow automatic production by the image data flow producing system according to the embodiment.
Figure 10:
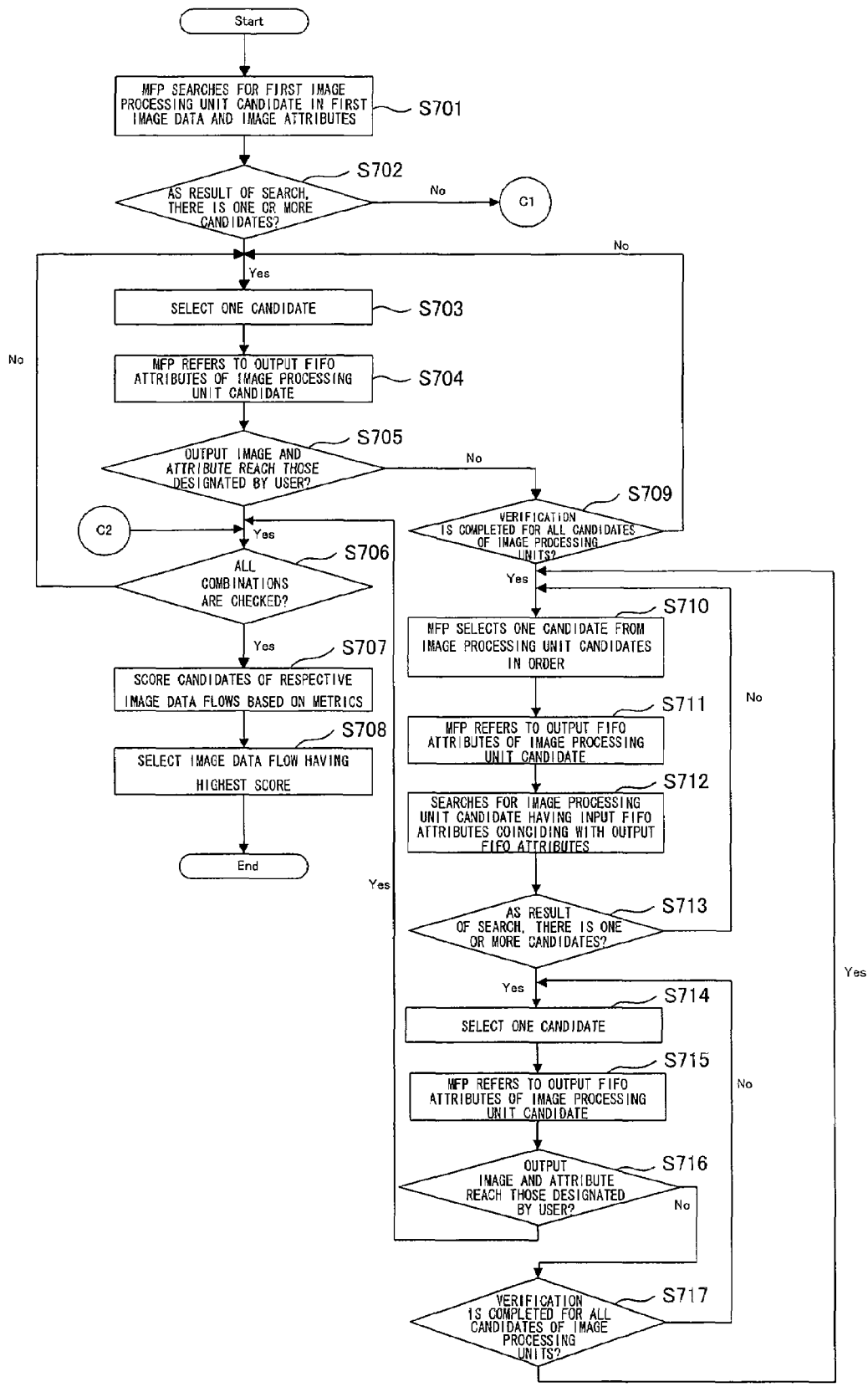
FIG. 10 is a flowchart showing details of the operation of image data flow automatic production by the image data flow producing system according to the embodiment.
Figure 11:
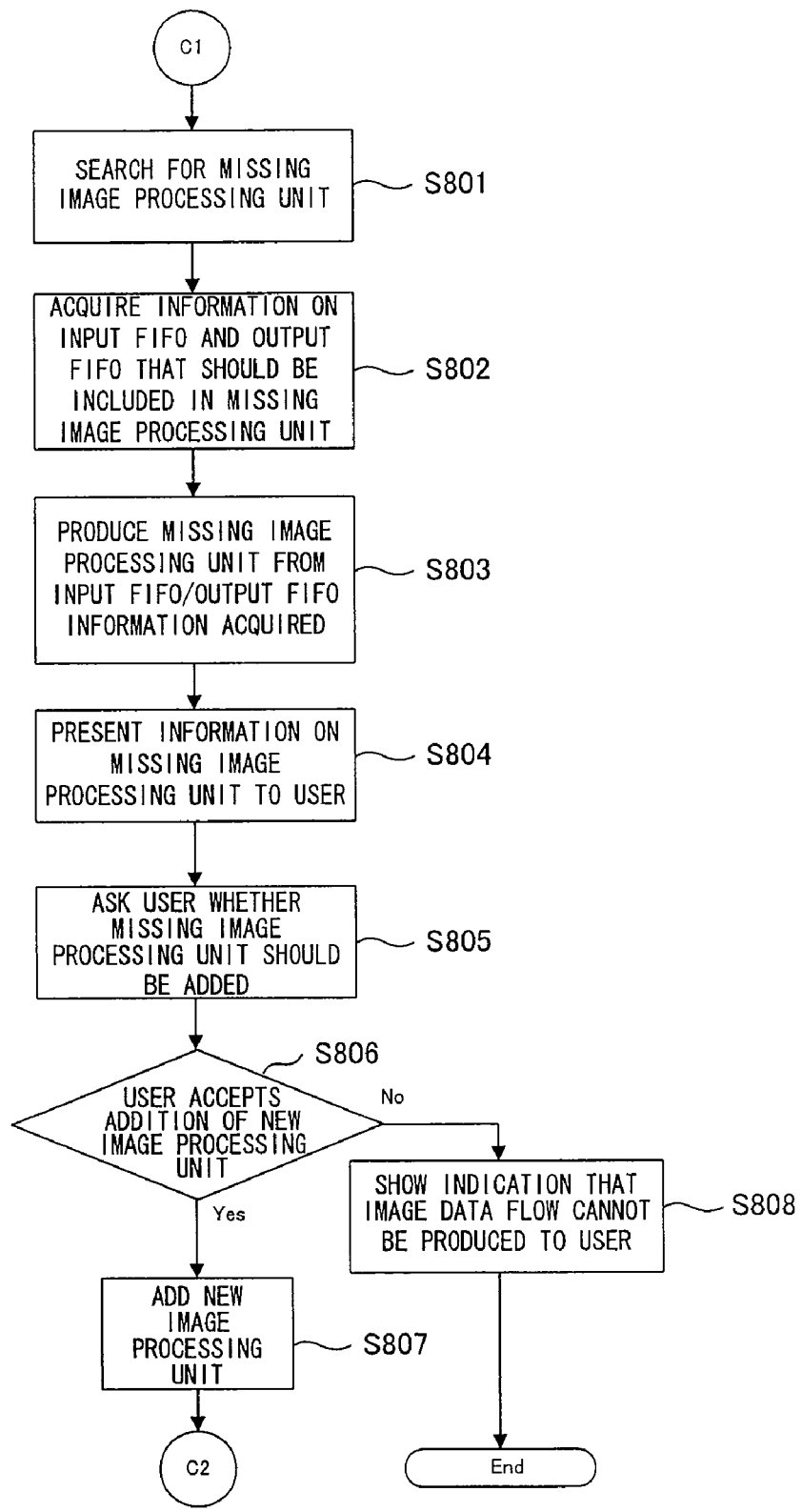
FIG. 11 is a flowchart showing details of image data flow automatic production by the image data flow producing system according to the embodiment.

FIGS. 10 and 11 show a detailed flowchart of S603 in FIG. 9 in which the MFP determines optimum connection of image processing units. First, the MFP 100 searches for a first image processing unit candidate (a first processing unit) in first image data and image attribute obtained via the UI 101 (the input attribute acquiring step) (S701). In this step, the MFP 100 searches for the attributes obtained via the UI 101 and the input FIFO attributes of the respective image processing units that coincide with each other.

As a result of the search, the MFP 100 checks whether there are one or more candidates of an image processing unit (S702). If there is no image processing unit candidate, the MFP 100 shifts to C1 shown in FIG. 11. If there are one or more candidates of an image processing unit, the MFP 100 selects one image processing unit candidate (a second processing unit) (S703).

The MFP 100 refers to output FIFO attributes of the first image processing unit candidate via the image processing unit managing unit 102 (S704).

The MFP 100 checks whether the output FIFO attributes are the same as attributes of a final output image acquired on the basis of an operation input of the user (the output attribute acquiring step) (S705). If the output FIFO attributes are the same as the attributes of the final output image, the MFP 100 proceeds to the next step S706. If the output FIFO attributes are not the same as the attributes of the final output image, the MFP 100 proceeds to recursive search in S709 and subsequent steps.

In the recursive search, first, the MFP 100 checks whether verification for all image processing unit candidates is completed (S709). If the verification is completed, in order to perform searches in deeper hierarchies (increase the number of image processing units connected), the MFP 100 selects one candidate of provisionally determined image processing unit candidates from the image processing unit candidates in order (S710). The MFP 100 conducts the search in the same manner as the method described above and recursively verifies whether attributes of the provisionally determined image processing unit candidates are the same as the attributes of the final output image designated by the user (from S711 to S717).

If a combination of image processing units having the same attributes as the attributes of the final output image designated by the user is found (Yes in S716), the MFP 100 temporarily stores the image processing units in the MEMORY 109. When the search is finally completed (from S716 to S706), one or more combinations of image processing units, that is, image data flows are defined.

The image processing unit combination editing unit 104 performs scoring for definitions of the respective image data flows based on metrics (S707). Details concerning this scoring method will be described later with reference to FIGS. 12 to 14. As a result of the scoring, the image processing unit combination editing unit 104 selects an image data flow having a highest score (S708).

In FIG. 11, a sub-flowchart of C1 and C2 that occur in FIG. 10 is explained. First, the MFP 100 searches for a missing image processing unit and grasps what kind of image processing unit should be found (S801).

The MFP 100 acquires information on an input FIFO and an output FIFO that should be included in the missing image processing unit (S802) and produces the missing image processing unit from information of the input FIFO and the output FIFO acquired (S803).

The MFP 100 presents information on the missing image processing unit to the user (S804). The information includes processing contents of an image processing Agent and attribute information of the input FIFO and the output FIFO. The MFP 100 asks the user to judge whether the missing image processing unit should be added (S805).

When the user accepts the addition of the new image processing unit (Yes in S806), the MFP 100 stores the new image processing unit in the image processing unit storing unit 103 via the image processing unit managing unit 102 (S807) and shifts to S706 shown in FIG. 10. On the other hand, when the user does not accept the addition of the new image processing unit (No in S806), the MFP shows an indication that an image data flow cannot be produced to the user via the UI 101 (S808).

Figure 12:
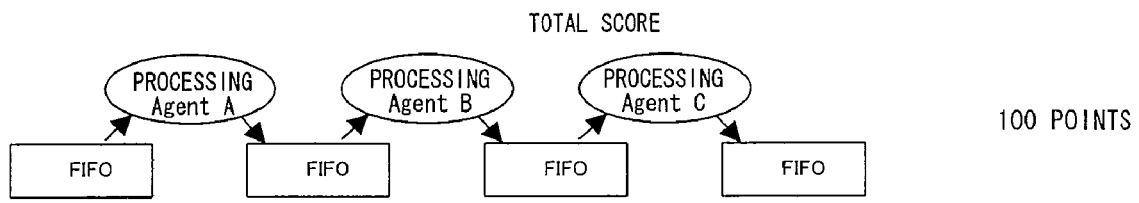
FIG. 12 is a diagram for explaining a scoring method for definition of an image data flow.
Figure 13:
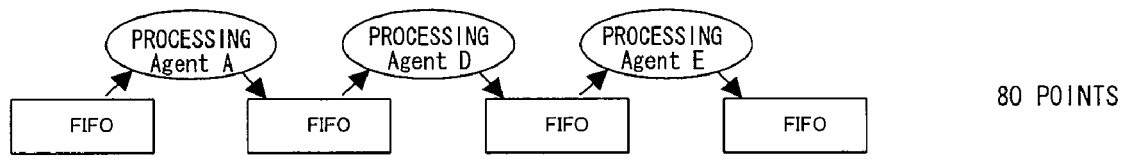
FIG. 13 is a diagram for explaining the scoring method for definition of an image data flow.
Figure 14:
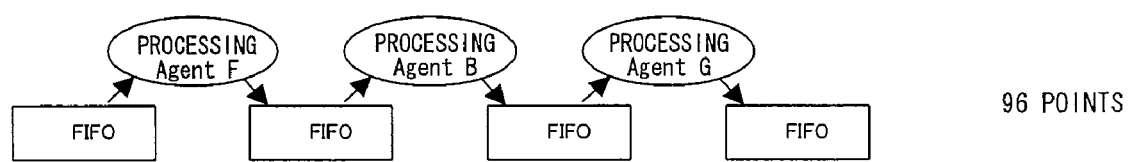
FIG. 14 is a diagram for explaining the scoring method for definition of an image data flow.

FIGS. 12 to 14 are diagrams for explaining an example of the scoring method for the respective image data flows by the image processing unit combination editing unit 104 in S707 shown in FIG. 10.

For example, a total score is calculated from the following expression.

Total score=Σ(performance scores of respective image processing Agents)×(performance coefficient)

+Σ(image quality scores of respective image processing Agents)×(image quality coefficient)

+Σ((resource consumption scores of respective image processing Agents)×(resource consumption coefficient))

For example, although the respective coefficients are fixed values, it is also possible to perform weighting by changing values of the respective coefficients in some cases. In the example shown in FIGS. 12 to 14, a total score of the image data flow shown in FIG. 12 is higher than total scores of the other image data flows shown in FIGS. 13 and 14 and obtains a highest total score. The MFP judges that this image data flow is optimum.

In the scoring method for image data flows, scoring does not always have to be performed on the basis of all of performance, an image quality, and resource consumption. Scoring based on any one of performance, an image quality, and resource consumption may be performed according to a purpose.

Figure 15:
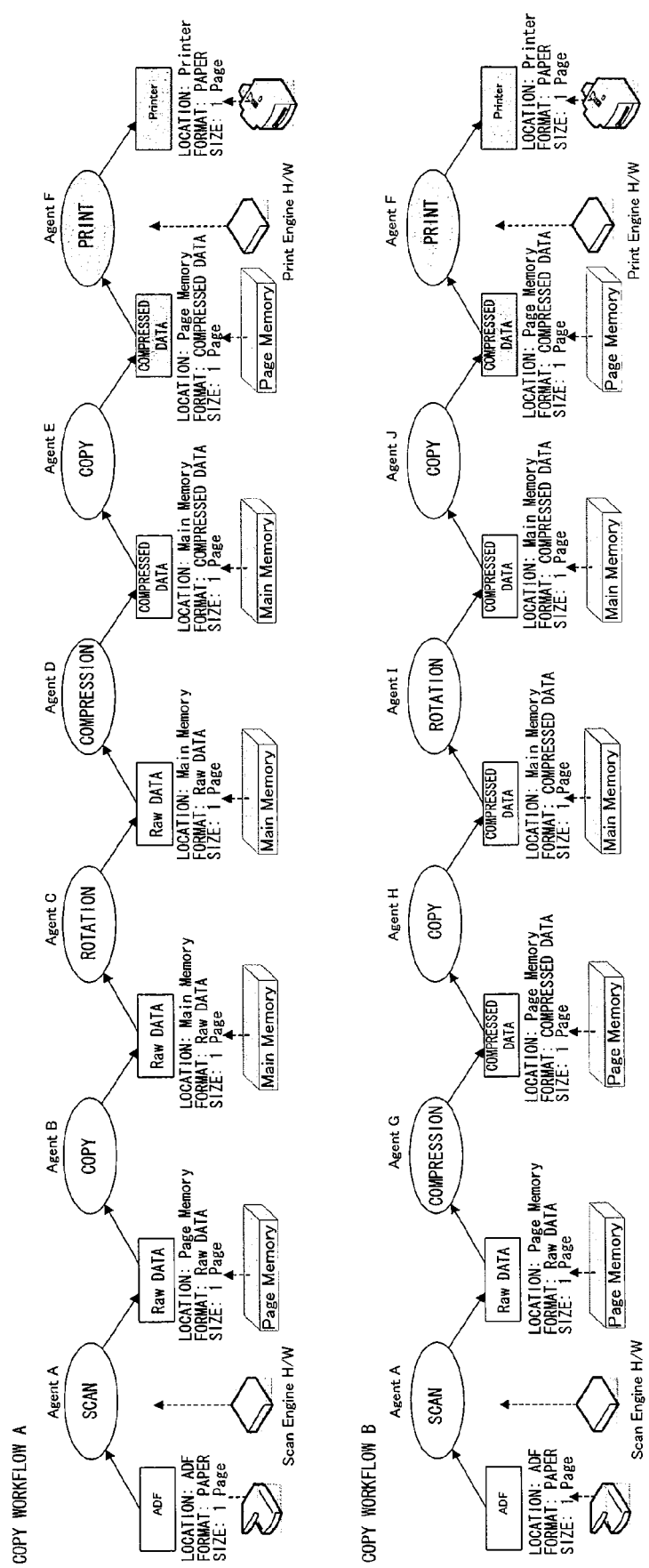
FIG. 15 is a diagram showing an example of plural image data flows produced.

FIG. 15 is a diagram showing an example of two ways of image data flows (copy processing workflows) produced by the image processing unit combination editing unit 104. In the example shown in the figure, a copy workflow A in which an image processing Agent A (scan), an image processing Agent B (copy), an image processing Agent C (rotation), an image processing Agent D (compression), an image processing Agent E (copy), and an image processing Agent F (print) perform processing for image data in this order and a copy workflow B in which the image processing Agent A (scan), an image processing Agent G (compression), an image processing Agent H (copy), an image processing Agent I (rotation), an image processing Agent J (copy), and the image processing Agent F (print) perform processing for image data in this order are shown.

FIG. 16 is a table showing scores associated with the respective image processing Agents forming the image data flows shown in FIG. 15. As shown in the figure, in the respective image processing Agents, a performance score that is a point indicating predominance in the viewpoint of "high performance", an image quality score that is a point indicating predominance in the viewpoint of "small image quality deterioration", and a resource consumption score that is a point indicating predominance in the viewpoint of "little resource consumption" are associated with one another.

As shown in FIG. 16, for example, there is a case in which there are two kinds of processing contents (from Page-Memory to MainMemory and from MainMemory to Page-Memory) concerning copy processing and two kinds of processing methods (compression on PageMemory and compression on MainMemory) concerning compression processing. In such a case, even if compression processing is the same, it is possible to flexibly produce an appropriate image data flow corresponding to a request by defining, in advance, compression with different performance such as compression on PageMemory with a performance score of "7" and an image quality score of "3" and compression on MainMemory with a performance score of "3" and an image quality score of "7".

When plural image data flows are produced as shown in FIG. 15, the image processing unit combination editing unit 104 performs evaluation of the respective image data flow as shown in FIG. 17 on the basis of definition information concerning the scores shown in FIG. 16. In the example shown in FIG. 15, as scores of the copy workflow A, a performance score is "26", an image quality score is "46", and a resource consumption score is "28". As scores of the copy workflow B, a performance score is "28", an image quality score is "34", and a resource consumption score is "34".

Thus, the image processing unit combination editing unit 104 selects the copy workflow B (26 points<28 points) when importance is attached to performance, selects the copy workflow A (46 points>34 points) when importance is attached to an image quality, and selects the copy workflow B (28 points<34 points) when importance is attached to resource consumption (a selecting step).

Figure 18:
FIG. 18 is a supplementary diagram for explaining a concept of a flowchart for automatically producing an optimum image data flow.
Figure 19:
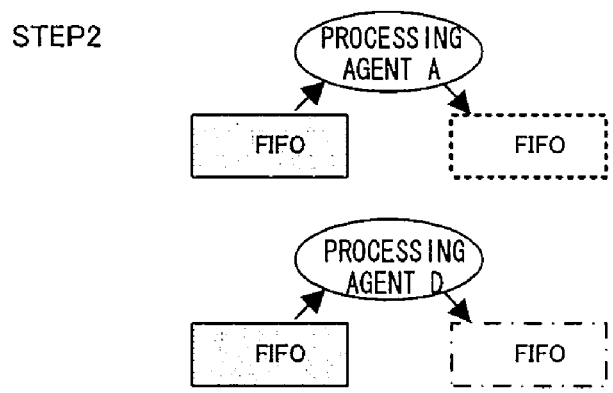
FIG. 19 is a supplementary diagram for explaining the concept of the flowchart for automatically producing an optimum image data flow.

FIGS. 18 to 22 are supplementary diagrams for explaining a concept of the flowchart for automatically producing an optimum image data flow shown in FIG. 10. First, as shown in FIG. 18, input FIFO attributes and output FIFO attributes are given as instruction information from the user (STEP 1). As shown in FIG. 19, image processing units having the same input attributes are searched for in the image processing unit storing unit 103 (STEP 2). In this example, as image processing unit candidates, the processing Agent A and the processing Agent D are found.

Figure 20:
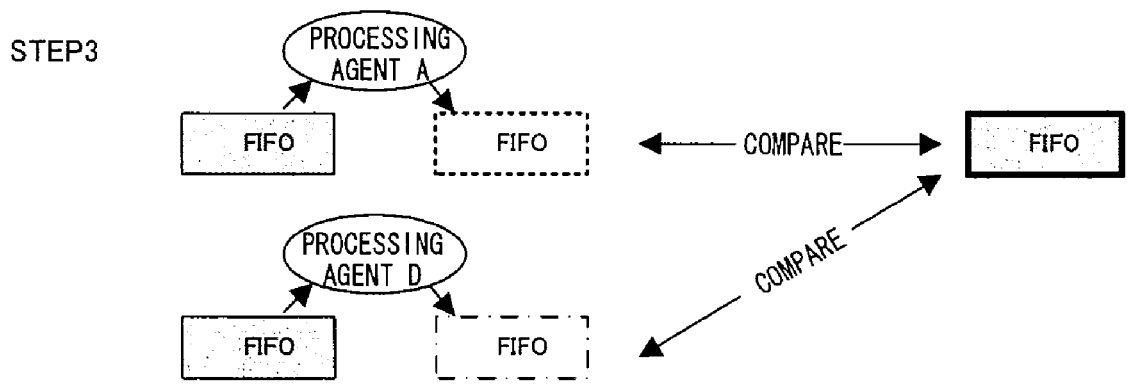
FIG. 20 is a supplementary diagram for explaining the concept of the flowchart for automatically producing an optimum image data flow.

As shown in FIG. 20, it is checked whether output FIFO attributes of the candidate image processing units and output FIFO attributes of an FIFO of a final goal are the same (STEP 3). In this example, output FIFO attributes of the processing Agent A and the processing Agent D are compared with the output FIFO attributes designated by the user in STEP 1 shown in FIG. 18. It is checked whether the former output FIFO attributes coincide with the latter output FIFO attributes. If both the output FIFO attributes coincide with each other, the processing Agent A and the processing Agent D are stored as one image data flow.

Figure 21:
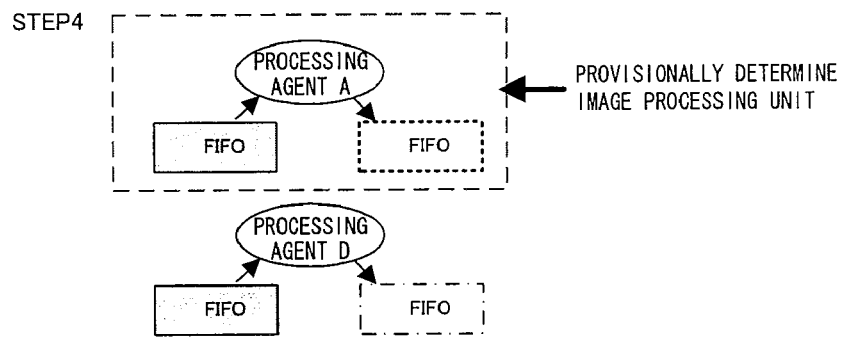
FIG. 21 is a supplementary diagram for explaining the concept of the flowchart for automatically producing an optimum image data flow.

As shown in FIG. 21, when both the output FIFO attributes do not coincide with each other in STEP 3, an image processing unit is provisionally determined in order to move a search object to a hierarchy one stage deeper (STEP 4). In this example, the processing Agent A is provisionally determined as an image processing unit.

Figure 22:
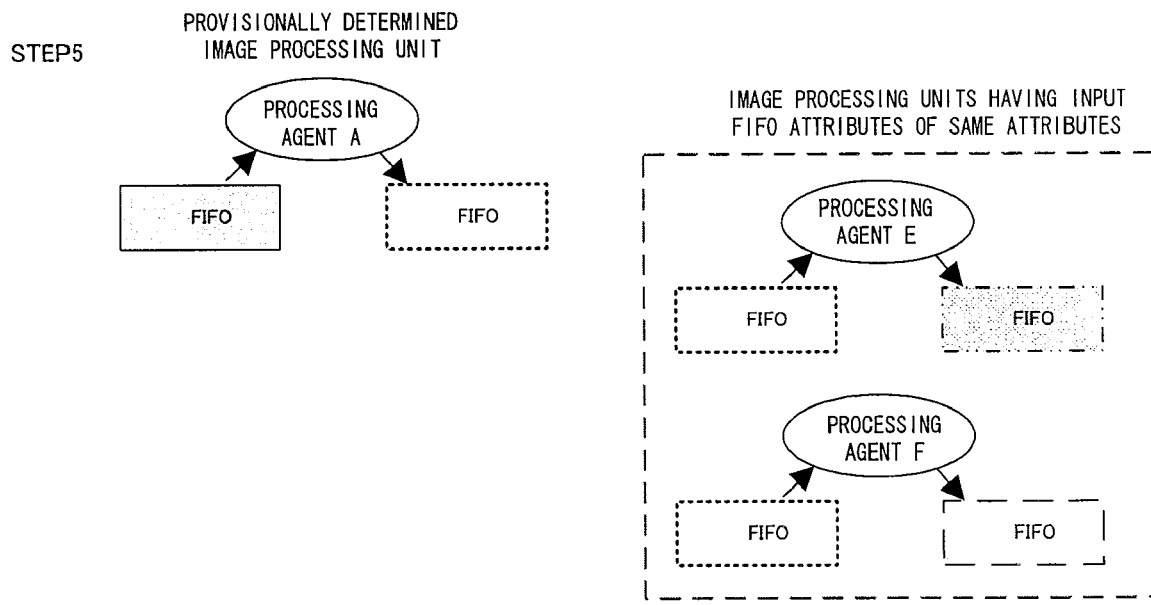
FIG. 22 is a supplementary diagram for explaining the concept of the flowchart for automatically producing an optimum image data flow.

As shown in FIG. 22, considering output FIFO attributes of the image processing unit provisionally determined, image processing units having input FIFO attributes coinciding with the output FIFO attributes are searched for (STEP 5). In this example, the processing Agent E and the processing Agent F are found as the image processing units having the input FIFO attributes of the same attributes.

Therefore, according to the embodiment, means with which the user is asked to designate attribute information of first and last image data of an image data flow and the MFP automatically produces a combination of image processing unit between the image data for handling intermediate image data is provided. Consequently, it is possible to provide a support system that can easily establish an image data flow in the MFP optimal for performance and an image quality without making the user to be conscious of the intermediate image data in the MFP.

The respective steps in the processing in the image data flow producing system (the image data flow producing method) are realized by causing the CPU 108 to execute an image data flow producing program stored in the MEMORY 109.

In the explanation of this embodiment, a function of carrying out the invention is stored in an apparatus in advance. However, the invention is not limited to this. The same function may be downloaded to the apparatus from a network or the same function stored in a recording medium may be installed in the apparatus. A form of the recording medium may be any form as long as the recording medium is a recording medium that can store a program and is readable by the apparatus such as a CD-ROM. The function obtained by install or download in advance in this way may be realized in cooperation with an OS (Operating System) in the apparatus.

The invention has been explained in detail according to the specific forms. However, it is obvious for those skilled in the art that various modifications and alterations of the invention could be made without departing from the spirit and the scope of the invention.

As described in detail above, according to the invention, it is possible to provide a technique that can contribute to a reduction in work loads in production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed.

What is claimed is:

1. An image data flow producing system that performs production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed, the image data flow producing system comprising:

an input attribute acquiring unit that acquires attribute information of image data that should be inputted to a processing unit at a front stage among the plural processing units forming the image data flow to be produced;

an output attribute acquiring unit that acquires attribute information of image data that should be outputted from a processing unit at a last stage among the plural processing units forming the image data flow to be produced; and an image data flow producing unit that determines, based on the attribute information acquired by the input attribute acquiring unit and the attribute information acquired by the output attribute acquiring unit, whether or not it is possible to combine a set of the processing units and selects a specific set of the processing units based on the determination to thereby produce an image data flow for outputting image data having the attribute information acquired by the output attribute acquiring unit when image data having the attribute information acquired by the input attribute acquiring unit is inputted.

2. An image data flow producing system according to claim 1, wherein the image data flow producing unit searches for a first processing unit, to which image data having the attribute information acquired by the input attribute acquiring unit can be inputted, in the predetermined plural processing units, completes image data flow production processing when attribute information of image data that can be outputted from the first processing unit found coincides with the attribute information acquired by the output attribute acquiring unit, provisionally determines the first processing unit when the former attribute information does not coincide with the latter attribute information, and searches for a second processing unit, to which image data having attribute information coinciding with the attribute information of the image data that can be outputted from the first processing unit can be inputted, in the predetermined plural processing units.

3. An image data flow producing system according to claim 1, wherein the processing unit performs at least one of data format conversion processing, scan processing, copy processing, image rotation processing, image compression processing, filter processing, image expansion processing, image reduction processing, print processing, FAX transmission processing, and FAX reception processing.

4. An image data flow producing system according to claim 1, wherein the attribute information includes at least one of a device that treats the image data, a storing location of the image data, a format of the image data, and a size of the image data.

5. An image data flow producing system according to claim 1, wherein the image data flow producing unit produces plural ways of image data flows, and the image data flow producing system includes a selecting unit that selects an image data flow having smallest deterioration of an image quality among plural image data flows produced by the image data flow producing unit.

6. An image data flow producing system according to claim 1, wherein the image data flow producing unit produces plural ways of image data flows, and the image data flow producing system includes a selecting unit that selects an image data flow having highest processing efficiency among plural image data flows produced by the image data flow producing unit.

7. An image data flow producing system according to claim 1, wherein the image data flow producing unit produces plural ways of image data flows, and the image data flow producing system includes a selecting unit that selects an image data flow having least resource consumption among plural image data flows produced by the image data flow producing unit.

8. An image data flow producing method of performing production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed, the image data flow producing method comprising:

an input attribute acquiring step of acquiring attribute information of image data that should be inputted to a processing unit at a front stage among the plural processing units forming the image data flow to be produced;

an output attribute acquiring step of acquiring attribute information of image data that should be outputted from a processing unit at a last stage among the plural processing units forming the image data flow to be produced; and an image data flow producing step of determining, based on the attribute information acquired in the input attribute acquiring step and the attribute information acquired in the output attribute acquiring step, whether or not it is possible to combine a set of the processing units and selecting a specific set of the processing units based on the determination to thereby produce an image data flow for outputting image data having the attribute information acquired in the output attribute acquiring step when image data having the attribute information acquired in the input attribute acquiring step is inputted.

9. An image data flow producing method according to claim 8, wherein, in the image data flow producing step, a first processing unit, to which image data having the attribute information acquired by the input attribute acquiring unit can be inputted, is searched for in the predetermined plural processing units, image data flow production processing is completed when attribute information of image data that can be outputted from the first processing unit found coincides with the attribute information acquired by the output attribute acquiring unit, the first processing unit is provisionally determined when the former attribute information does not coincide with the latter attribute information, and a second processing unit, to which image data having attribute information coinciding with the attribute information of the image data that can be outputted from the first processing unit can be inputted, is searched for in the predetermined plural processing units.

10. An image data flow producing method according to claim 8, wherein the processing unit performs at least one of data format conversion processing, scan processing, copy processing, image rotation processing, image compression processing, filter processing, image expansion processing, image reduction processing, print processing, FAX transmission processing, and FAX reception processing.

11. An image data flow producing method according to claim 8, wherein the attribute information includes at least one of a device that treats the image data, a storing location of the image data, a format of the image data, and a size of the image data.

12. An image data flow producing method according to claim 8, wherein in the image data flow producing step, plural ways of image data flows are produced, and the image data flow producing method includes a selecting step of selecting an image data flow having smallest deterioration of an image quality among plural image data flows produced by the image data flow producing unit.

13. An image data flow producing method according to claim 8, wherein in the image data flow producing step, plural ways of image data flows are produced, and the image data flow producing method includes a selecting step of selecting an image data flow having highest processing efficiency among plural image data flows produced by the image data flow producing unit.

14. An image data flow producing method according to claim 8, wherein in the image data flow producing step, plural ways of image data flows are produced, and the image data flow producing method includes a selecting step of selecting an image data flow having least resource consumption among plural image data flows produced by the image data flow producing unit.

15. An Image forming apparatus that performs production of an image data flow that is formed by plural processing units for performing predetermined processing for image data and sequentially passes processing results in processing units at pre-stages to processing units at post-stages as inputs to the processing units at the latter stages to thereby apply a series of processing to image data to be processed; the image forming apparatus comprising:

an input attribute acquiring unit that acquires attribute information of image data that should be inputted to a processing unit at a front stage among the plural processing units forming the image data flow to be produced;

an output attribute acquiring unit that acquires attribute information of image data that should be outputted from a processing unit at a least stage among the plural processing units forming the image data flow to be produced; and an image data flow producing unit that determines, based on the attribute information acquired by the output attribute acquiring unit, whether or not it is possible to combine a set of the processing units and selects a specific set of the processing units based on the determination to thereby produce an image data flow for outputting image data having the attribute information acquired by the output attribute acquiring unit when image data having the attribute information acquired by the input attribute acquired unit is inputted.

16. The image forming apparatus according to claim 15, wherein the image data flow producing unit searches for a first processing unit, to which image data having the attribute information acquired by the input attribute acquiring unit can be inputted, in the predetermined plural processing units, completes image data flow production processing when attribute information of image data that can be outputted from the first processing unit found coincides with the attribute information acquired by the output attribute acquiring unit, provisionally determines the first processing unit when the former attribute information does not coincide with the latter attribute information, and searches for a second processing unit, to which image data having attribute information coinciding with the attribute information of the image data that can be outputted from the first processing unit can be inputted, in the predetermined plural processing units.

17. The image forming apparatus according to claim 15, wherein the processing unit performs at least one of the data format conversion processing, scan processing, copy processing, image rotation processing, image compression processing, filter processing, image expansion processing, image reduction processing, print processing, FAX transmission processing, and FAX reception processing.

18. The image forming apparatus according to claim 15, wherein the attribute information includes at least one of a device that treats the image data, a storing location of the image data, a format of the image data, and a size of the image data.

19. The image forming apparatus according to claim 15, wherein
the image data flow producing unit produces plural ways of image data flows, and
the image forming apparatus includes a selecting unit that selects an image data flow having smallest deterioration of an image quality among plural image data flows produced by the image data flow producing unit.

20. The image forming apparatus according the claim 15, wherein
the image data flow producing unit produces plural ways of image data flows, and
the image forming apparatus includes a selecting unit that selects an image data flow having highest processing efficiency among plural image data flows produced by the image data flow producing unit.

* * * * *